(12) United States Patent
Vinski et al.

(10) Patent No.: US 9,279,367 B2
(45) Date of Patent: Mar. 8, 2016

(54) PRESSURE REGULATING VALVE FOR AIRCRAFT ENGINE

(71) Applicant: PRATT & WHITNEY CANADA CORP., Longueuil (CA)

(72) Inventors: Johnny Vinski, Chateauguay (CA); Daniel Blais, St-Jean sur Richelieu (CA); Stephane Fortier, Chambly (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 252 days.

(21) Appl. No.: 14/050,721

(22) Filed: Oct. 10, 2013

(65) Prior Publication Data
US 2014/0033730 A1 Feb. 6, 2014

Related U.S. Application Data

(62) Division of application No. 12/361,771, filed on Jan. 29, 2009, now Pat. No. 8,578,967.

(51) Int. Cl.
*F02C 7/232* (2006.01)
*F02C 7/00* (2006.01)
(Continued)

(52) U.S. Cl.
CPC . *F02C 7/00* (2013.01); *F02C 7/232* (2013.01); *F16K 11/0716* (2013.01); *G05D 16/106* (2013.01); *F05D 2260/85* (2013.01); *Y10T 137/2574* (2015.04); *Y10T 137/2605* (2015.04); *Y10T 137/2612* (2015.04); *Y10T 137/2622* (2015.04); *Y10T 137/2625* (2015.04); *Y10T 137/2627* (2015.04); *Y10T 137/2642* (2015.04);
(Continued)

(58) Field of Classification Search
CPC .................. Y10T 137/2574; Y10T 137/2605; Y10T 137/2612; Y10T 137/2622; Y10T 137/2625; Y10T 137/2627; Y10T 137/2642; Y10T 137/8671; Y10T 137/86879; Y10T 137/86887; F02C 7/00; F02C 7/232; F16K 11/0716; G05D 16/106; F05D 2260/85
USPC ............. 137/115.13, 115.14, 115.18, 115.19, 137/115.2, 115.26, 625.48, 625.69
See application file for complete search history.

(56) References Cited

U.S. PATENT DOCUMENTS

| 2,317,745 | A | * | 4/1943 | Duckstein | ............... | F16N 23/00 |
| | | | | | | 123/196 R |
| 2,875,774 | A | * | 3/1959 | Banker | ................... | F15B 1/027 |
| | | | | | | 137/115.18 |
| 2,989,972 | A | * | 6/1961 | Brady | ..................... | F15B 1/027 |
| | | | | | | 137/115.18 |

(Continued)

*Primary Examiner* — William McCalister
(74) *Attorney, Agent, or Firm* — Norton Rose Fulbright Canada LLP

(57) ABSTRACT

The fluid pressure regulating valve is for use in an aircraft engine. The valve has at least a first fluid inlet, a first fluid outlet and a second fluid outlet. The valve comprises: a valve housing having a first valve spool interior cavity; a first fluid path within the valve housing from the fluid inlet to the first fluid outlet; a second fluid path within the valve housing from the fluid inlet to the second fluid outlet; a first valve spool mounted for reciprocal motion within the first valve spool cavity between a first position and a second position, the first valve spool having a second valve spool interior cavity and being spring-biased to its first position; and a second valve spool mounted for reciprocal motion within the second valve spool cavity between a first position and a second position, the second valve spool being spring-biased to its first position, the second valve spool closing the first fluid path at its second position when the first valve spool is substantially at its first position.

6 Claims, 12 Drawing Sheets

(51) Int. Cl.
*F16K 11/07* (2006.01)
*G05D 16/10* (2006.01)

(52) U.S. Cl.
CPC .... *Y10T 137/8671* (2015.04); *Y10T 137/86879* (2015.04); *Y10T 137/86887* (2015.04)

(56) References Cited

U.S. PATENT DOCUMENTS

| | | | |
|---|---|---|---|
| 2,996,146 A | 8/1961 | Beam, Jr. et al. | |
| 3,027,880 A | 4/1962 | Van Den Bussche | |
| 3,262,467 A | 7/1966 | Stacey | |
| 3,724,494 A | 4/1973 | Alber | |
| 3,769,790 A * | 11/1973 | Thebert | F01M 11/067 184/6.11 |
| 3,890,780 A * | 6/1975 | Hagemeister | F01D 25/16 184/6.11 |
| 4,069,843 A | 1/1978 | Chatterjea | |
| 4,164,962 A | 8/1979 | Soderberg | |
| 4,202,171 A | 5/1980 | Jurisch et al. | |
| 4,245,465 A | 1/1981 | Milo | |
| 4,440,191 A | 4/1984 | Hansen | |
| 4,449,548 A | 5/1984 | Tutherly | |
| 4,518,004 A | 5/1985 | Hsu et al. | |
| 4,531,358 A | 7/1985 | Smith | |
| 4,569,196 A * | 2/1986 | Waddington | F01D 25/20 184/6.4 |
| 4,620,560 A | 11/1986 | Coutant | |
| 4,640,308 A | 2/1987 | Toelle | |
| 4,890,636 A | 1/1990 | Higuchi | |
| 4,921,547 A * | 5/1990 | Kosarzecki | G05D 16/10 137/115.09 |
| 4,974,410 A | 12/1990 | Wright et al. | |
| 5,067,454 A | 11/1991 | Waddington et al. | |
| 5,156,332 A | 10/1992 | Dyer | |
| 5,341,839 A * | 8/1994 | Kobayashi | E03D 3/04 137/505.13 |
| 5,448,882 A * | 9/1995 | Dyer | F02C 9/263 60/39.281 |
| 5,941,074 A * | 8/1999 | Schultz | F02C 7/228 137/118.02 |
| 6,058,694 A | 5/2000 | Ackerman et al. | |
| 6,058,962 A * | 5/2000 | Hayashi | B62D 5/062 137/115.05 |
| 6,092,546 A | 7/2000 | Lebrun et al. | |
| 7,422,033 B2 | 9/2008 | Barber | |
| 7,516,758 B2 * | 4/2009 | Huynh | F15B 13/0401 137/625.68 |
| 7,909,060 B2 * | 3/2011 | Yamamoto | G05D 16/2026 137/625.6 |

\* cited by examiner

PRESSURE REGULATING VALVE FOR AIRCRAFT ENGINE

CROSS-RELATED APPLICATION

The present application is a divisional of U.S. patent application Ser. No. 12/361,771, filed Jan. 29, 2009, the entire contents of which is hereby incorporated by reference.

TECHNICAL FIELD

The technical field generally relates to pressure regulating valves, for example those for use in aircraft engines such as gas turbines and other aircraft engines.

BACKGROUND

An aircraft engine often comprises a pressure regulating valve (PRV) designed to maintain fluid pressure, for instance lubricating oil in a main oil supply circuit, within a desired pressure range when the engine is operating. A PRV can also be designed to avoid excessive oil feed during engine start-up and shutdown at locations having a pressure seal, for instance bearing cavities. Pressure seals are provided to mitigate oil leaks between two components where at least one moves relative to the other. These pressure seals are often not entirely efficient when they operate below a minimum pressure. This situation can occur during engine start-up and engine shutdown, for instance when the rotational speed of the engine is under idle speed. The PRV then initially diverts the pressurized oil coming from the main oil supply circuit to a location upstream an oil supply pump until the pressure, for instance the pressure in a bearing cavity, is sufficient for the pressure seals to operate efficiently. The main bypass outlet is closed afterwards and should remain closed when the aircraft engine is above idle speed since an aircraft engine then generates enough pressure for the pressure seals to operate efficiently. Some situations, however, could cause the oil pressure to temporarily decrease down to a very low value during a flight, for instance when the aircraft is subjected to a negative "g" event. A negative-g event can occur during an inverted flight or in some other circumstances during a flight, such as during the moments immediately following a water load release by a firefighter aircraft. During a negative-g event, air bubbles can enter the main oil supply circuit through the supply pump, thereby reducing the oil pressure. This could cause some PRVs to open the main bypass outlet and possibly increase the time required for the oil pressure to recover. Room for improvements thus exists in the design of a PRV.

SUMMARY

In one aspect, the present concept provides a fluid pressure regulating valve for an aircraft engine, the valve having at least a first fluid inlet, a first fluid outlet and a second fluid outlet, the valve comprising: a valve housing having a first valve spool interior cavity; a first fluid path within the valve housing from the fluid inlet to the first fluid outlet; a second fluid path within the valve housing from the fluid inlet to the second fluid outlet; a first valve spool mounted for reciprocal motion within the first valve spool cavity between a first position and a second position, the first valve spool having a second valve spool interior cavity and being spring-biased to its first position; and a second valve spool mounted for reciprocal motion within the second valve spool cavity between a first position and a second position, the second valve spool being spring-biased to its first position, the second valve spool closing the first fluid path at its second position when the first valve spool is substantially at its first position.

In another aspect, the present concept provides a fluid pressure regulating valve for a pressurized fluid system of an aircraft engine, the pressurized fluid system including at least a main supply circuit, a supply pump and a fluid tank, the valve comprising: a valve housing, the valve housing comprising a hollow valve housing body and an elongated sleeve having at least a portion inserted in the valve housing body, the sleeve having a plurality of axially spaced-apart ports, a first one of the ports receiving a first reference pressure, a second one of the ports in fluid communication with the main supply circuit, a third one of the ports in fluid communication with a location upstream the supply pump, a fourth one of the ports in fluid communication with the fluid tank, a fifth one of the ports receiving a second reference pressure, and a sixth one of the ports receiving a third reference pressure; a first valve spool in sliding engagement with an interior of the sleeve, the first valve spool being movable along a longitudinal axis of the sleeve between a first position and a second position in response to a first pressure differential between the first port and the fifth port; and a second valve spool in sliding engagement with an interior of the first valve spool, the second valve spool being movable along the longitudinal axis between a first position and a second position, the second valve spool preventing fluid from passing between the second port and the third port when a second pressure differential between the fifth port and the sixth port exceeds a minimum threshold and the first valve spool is substantially at its first position.

In another aspect, the present concept provides a method of regulating fluid pressure in a pressurized fluid system of an aircraft engine, the method comprising: starting the engine from a rotational speed below idle speed and diverting at least some of the fluid through a main recirculation bypass while a pressure differential between the fluid pressure and another location in the engine is below a threshold value; while the engine is still below idle speed, closing the main recirculation bypass when the pressure differential reaches the threshold value; maintaining the fluid pressure within a target range when the engine is above idle speed and the pressure differential is above the threshold value; and while the engine is above idle speed, preventing the main recirculation bypass from opening when the pressure differential falls below the threshold value.

Further details of these and other aspects of the present concept will be apparent from the following detailed description and the appended figures.

DETAILED DESCRIPTION

Figure 1:
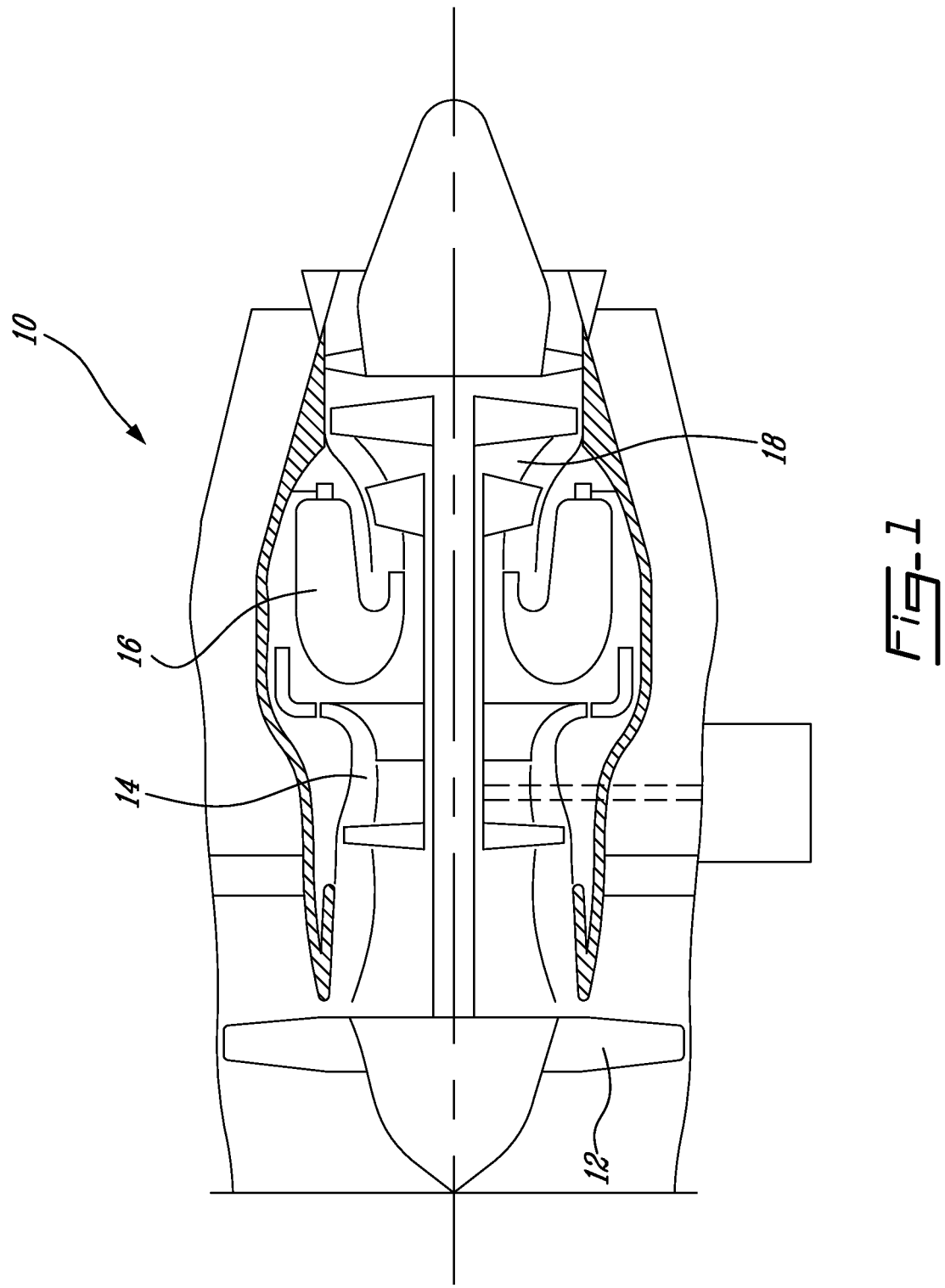
FIG. 1 schematically illustrates an example of an aircraft engine.

FIG. 1 illustrates an example of an aircraft engine 10 generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. It should be noted from the outset that FIG. 1 only illustrates one among many possible example applications in which a pressure regulating valve (PRV) such as the one presented herein can be used. For instance, a PRV can be used in any other suitable application, such as turboprop or other turboshaft aircraft engine types or even in aircraft engines for vehicles that are not aircrafts, and still other suitable applications exist, as will be appreciated by the skilled reader.

Figure 2:
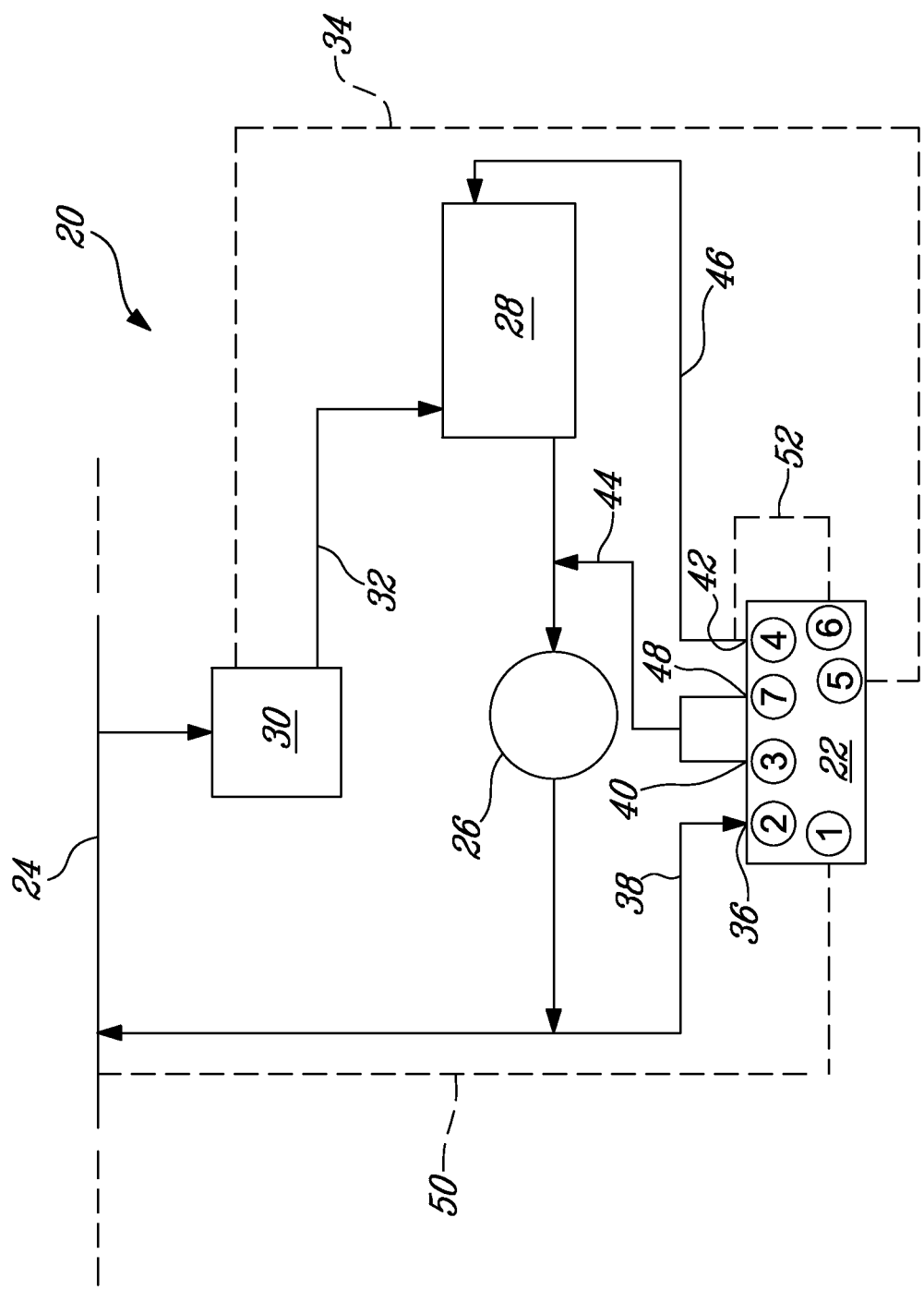
FIG. 2 is a schematic view showing a simplified example of a pressurized oil system for an aircraft engine incorporating an example of a pressure regulating valve (PRV) as improved.

FIG. 2 is a schematic view showing a simplified example of a pressurized oil system 20 for an aircraft engine in which a PRV 22 is used. It should be noted that FIG. 2 only illustrates one among many possible examples of a pressurized fluid system in which the PRV 22 can be used.

The illustrated pressurized oil system 20 comprises a main oil supply circuit 24 by which pressurized oil is supplied to various components of the engine. The pressurized oil system 20 includes at least one supply pump 26 provided for pumping oil from an oil tank 28 into the main oil supply circuit 24. One of the components to which oil can be supplied may include, for instance, a bearing provided in a bearing cavity. An example of a bearing cavity is illustrated in FIG. 2 at 30. The oil supplied to the bearing returns to the oil tank 28 through a scavenge oil circuit 32. Oil may be supplied to other components as well. Still, it should be noted that the pressurized oil system 20 may comprise many other components that are not shown in the simplified oil schematic of FIG. 2, for instance filters, check valves, flow restrictors, heat exchangers, scavenge pumps, etc.

One of the functions of the PRV 22 is to maintain the oil pressure in the main oil supply circuit 24, which pressure is hereafter referred to as the Main Operating Pressure (MOP), within a desired pressure range when the aircraft engine is operating. The pressure range can be measured, for instance, as a relative pressure between the main oil supply circuit 24 and a location within the aircraft engine. In FIG. 2, this location within the aircraft engine is the bearing cavity 30. The bearing cavity 30 can be, for instance, the cavity of the bearing closer to the last stage of the multistage compressor. This specific bearing cavity 30 often has an internal pressure that is somewhat proportional to the pressure at the outlet of the last compressor stage of the aircraft engine (which pressure is sometimes referred to as "P3"). The bearing cavity 30 is connected to the PRV 22 through a corresponding pilot line 34 in the illustrated example.

It should be noted that the reference pressure can be taken in another bearing cavity or elsewhere in the aircraft engine.

FIG. 2 schematically shows that the PRV 22 has an oil inlet 36 connected to the main oil supply circuit 24 using an oil inlet line 38. The PRV 22 also includes at least two oil outlets 40, 42, the first oil outlet 40 being connected to a location upstream the supply pump 26 by an oil line 44 and through which oil is recirculated to the supply pump 26. The second oil outlet 42 is connected to the oil tank 28 by an oil line 46. The oil line 44 between the first oil outlet 40 of the PRV 22 and the location upstream the supply pump 26 is referred to hereafter as the bypass oil line 44. The oil line 46 between the second oil outlet 42 of the PRV 22 and the oil tank 28 is referred to hereafter as the oil tank line 46.

The illustrated PRV 22 also comprises a third oil outlet 48 that is also connected to a location upstream the supply pump 26, in this case using the bypass oil line 44 to which the first oil outlet 40 is also connected. Variants, however are possible.

The first oil outlet 40 and the third oil outlet 48 are referred to hereafter as the main bypass outlet 40 and the secondary bypass outlet 48, respectively.

FIG. 2 further shows that the PRV 22 comprises a pilot line 50 extending between the PRV 22 and a location in the main oil supply circuit 24. It also comprises a pilot line 52 that is indirectly connected to the oil tank 28 through the oil tank line 46.

During operation of the aircraft engine, the MOP is controlled by varying the oil flow coming from the oil inlet 36 of the PRV 22 and flowing out through the second oil outlet 42 and the secondary bypass outlet 48. It should be noted that the MOP can also be controlled in a PRV without a secondary bypass outlet, thus only by varying the oil flow coming out through the second oil outlet 42.

Figure 3:
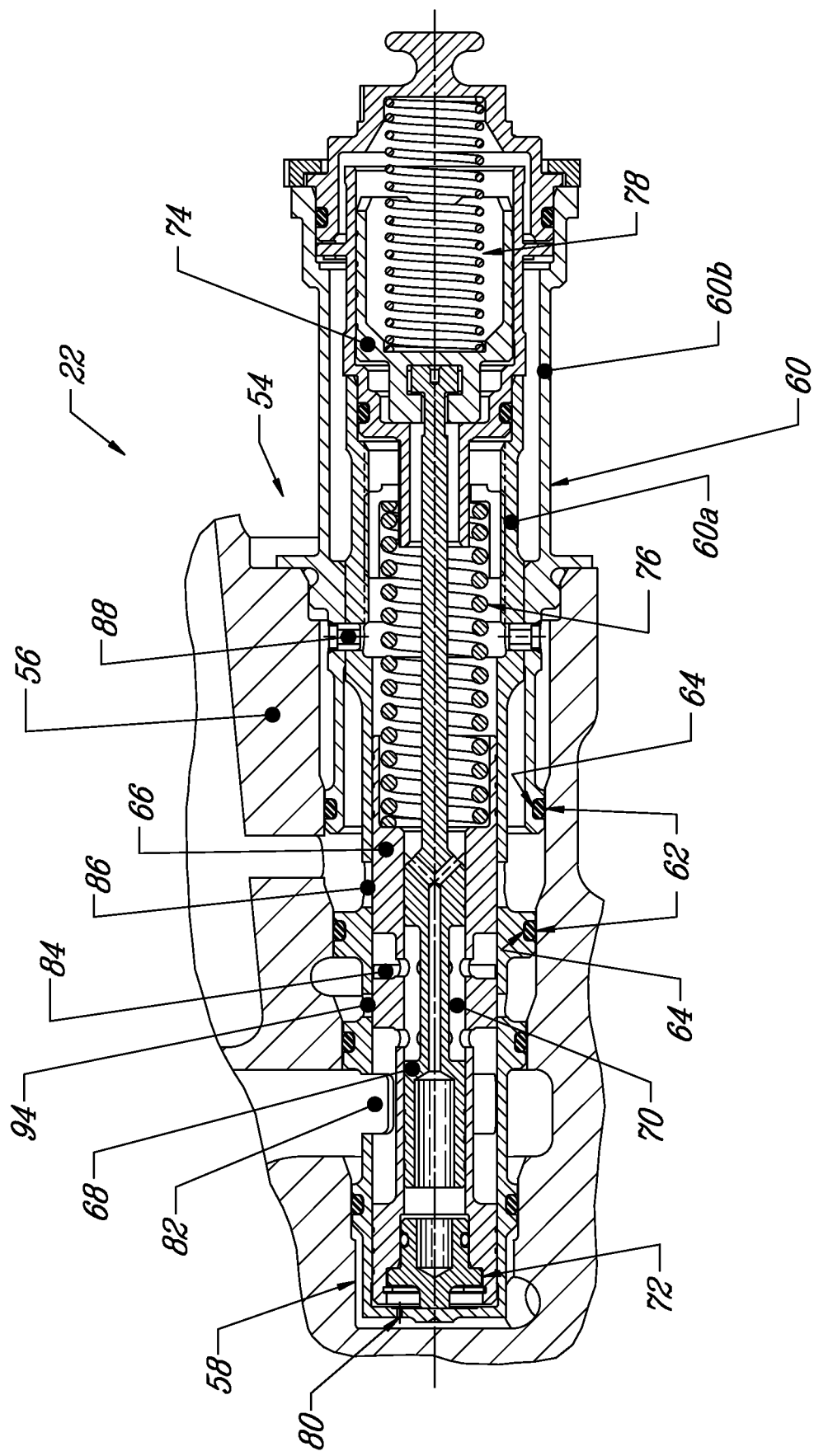
FIG. 3 is a longitudinal cross-section view showing the interior of an example of a PRV as improved.

FIG. 3 is a longitudinal cross-section view showing an example of the interior of the PRV 22 as it would appear when the aircraft engine is not operating or when it rotates at a very low rotational speed. This PRV 22 is designed for use in an aircraft engine that can potentially be subjected to a negative-g event or another situation that may cause a drop of the MOP while the aircraft engine operates above idle speed. It should be noted from the outset that FIG. 3 only illustrates one among many possible examples of a PRV as improved. The exact configuration, shape, size, number, etc. of the various components of the PRV 22 can vary compared to what is shown and described.

The illustrated PRV 22 includes a hollow valve housing 54 in which various other components of the PRV 22 are located. The valve housing 54 generally comprises a body 56 having a main interior cavity 58 and a removable elongated sleeve 60 having at least a portion inserted in the interior cavity 58. A portion of the sleeve 60 projects out of an open end of the cavity 58 in the example shown in FIG. 3. The sleeve 60 has a plurality of axially spaced-apart ports that are in fluid communication with corresponding oil lines outside the PRV 22.

Figure 4:
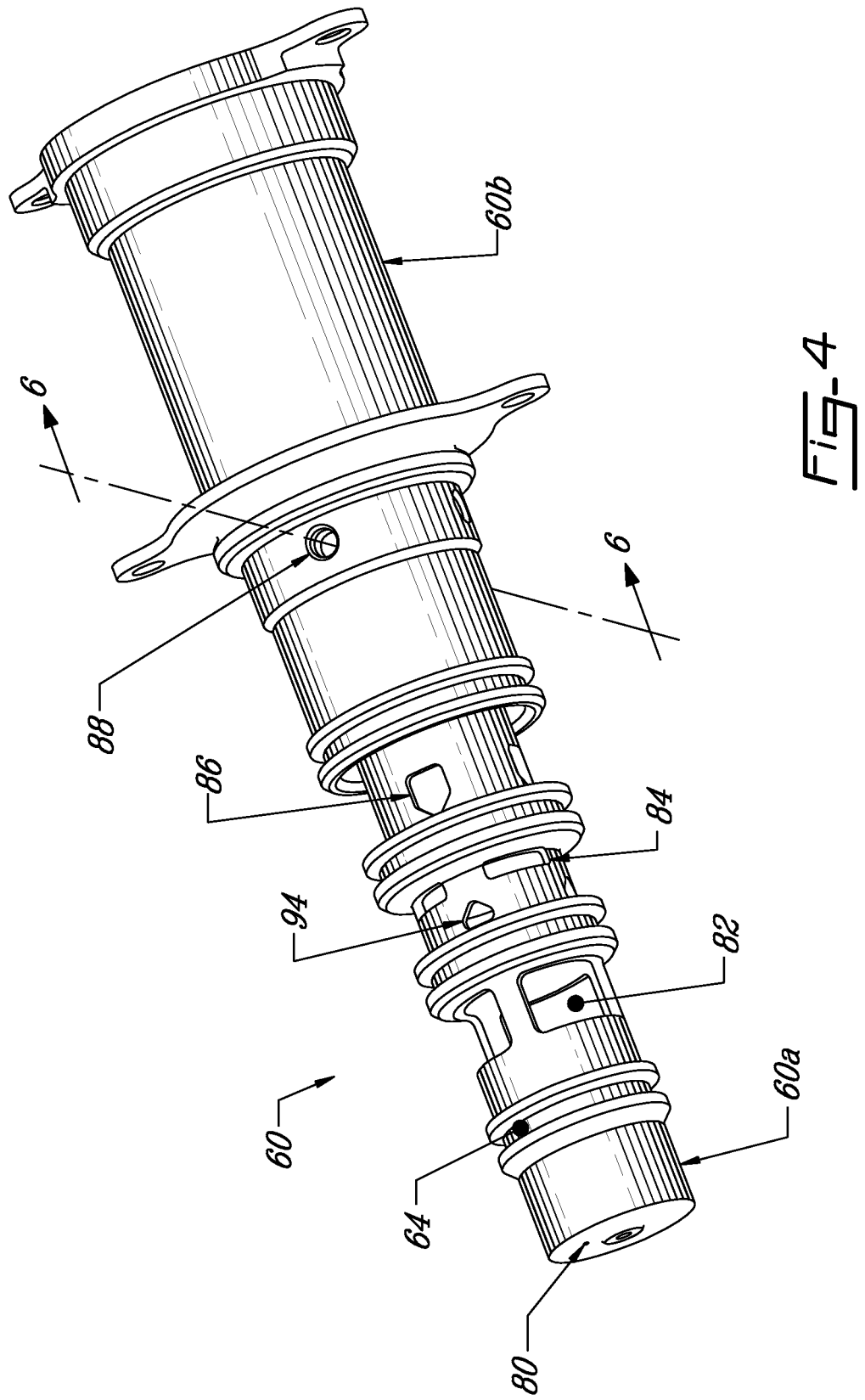
FIG. 4 is an isometric view showing the two-part sleeve of the PRV in FIG. 3.
Figure 5:
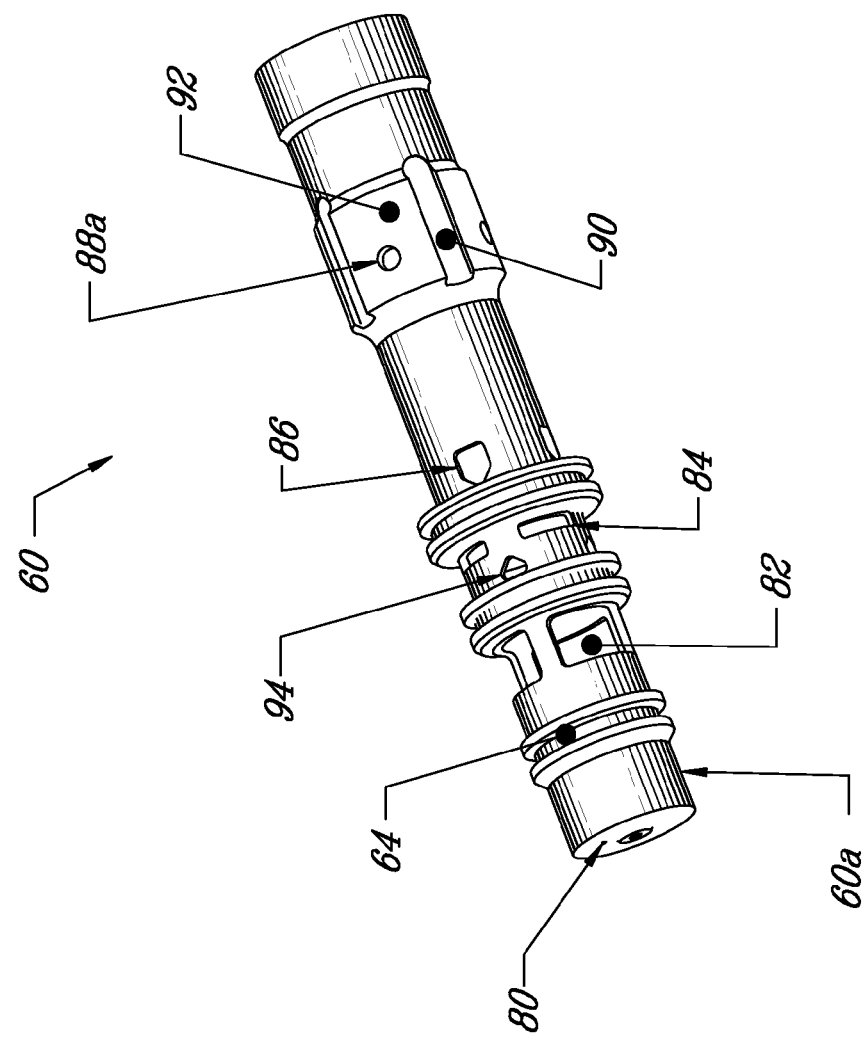
FIG. 5 is an exploded isometric view showing the inner sleeve part and the outer sleeve part of the two-part sleeve in FIG. 4.

The sleeve 60 of the illustrated example comprises two parts 60a, 60b, as also shown in FIGS. 4 and 5. The sleeve 60 has a circular cross-section. FIG. 4 is an isometric view showing the two-part sleeve 60 when the parts 60a, 60b are assembled together. FIG. 5 is an exploded isometric view showing the inner sleeve part 60a and the outer sleeve part 60b detached from one another. Variants are possible as well. For instance, it is possible to provide a valve housing without a removable sleeve.

Referring back to FIG. 3, the valve housing body 56 also comprises various chambers surrounding the sleeve 60 and with which various ports of the sleeve 60 are in fluid communication. The chambers are also isolated from each other using a plurality of seals 62 (for example O-rings) provided in corresponding circumferential grooves 64 on the outer surface of the sleeve 60. It should be noted that variants are possible as well.

The PRV 22 includes two concentric valve spools 66, 68. The first valve spool 66 is mounted for reciprocal motion within the interior of the valve housing 54, in this case within the sleeve 60, the first valve spool 66 being in sliding engagement with the interior of the sleeve 60. The first valve spool 66 is movable along a longitudinal axis of the sleeve 60 between a first position and a second position in response to a first pressure differential. The first valve spool 66 is at its first position in FIG. 3.

The second valve spool 68 is mounted for reciprocal motion within a cavity 70 inside the first valve spool 66, the second valve spool 68 being in sliding engagement with the interior of the first valve spool 66. The second valve spool 68 also has a portion projecting out of the first valve spool 66. The second valve spool 68 is movable along the longitudinal axis of the sleeve 60 between a first position and a second position in response to a second pressure differential. The second valve spool 68 is at its first position in FIG. 3. As will be explained later, one of the functions of the second valve spool 68 is to close the main bypass outlet 40 when the second pressure differential exceeds a minimum threshold and the first valve spool 66 is substantially at its first position (i.e. that the first valve spool 66 is at or close enough to its first position for the main bypass outlet 40 to open).

The illustrated PRV 22 comprises a first spool actuator 72 mounted to the first valve spool 66 and a second spool actuator 74 mounted to the second valve spool 68. The first spool actuator 72 generates a first actuating force in response to the first pressure differential and the second spool actuator 74 generates a second actuating force in response to the second pressure differential. Both spool actuators 72, 74 work against two corresponding compression springs 76, 78. The first spring 76 generates a first preload force acting on the first valve spool 66, the preload force being opposite the first actuating force. The second spring 78 generates a second preload force on the second valve spool 68, the second preload force being opposite the second actuating force. The first valve spool 66 is biased to its first position by the first spring 76 and the second valve spool 68 is biased to its first position by the second spring 78.

Figure 7:
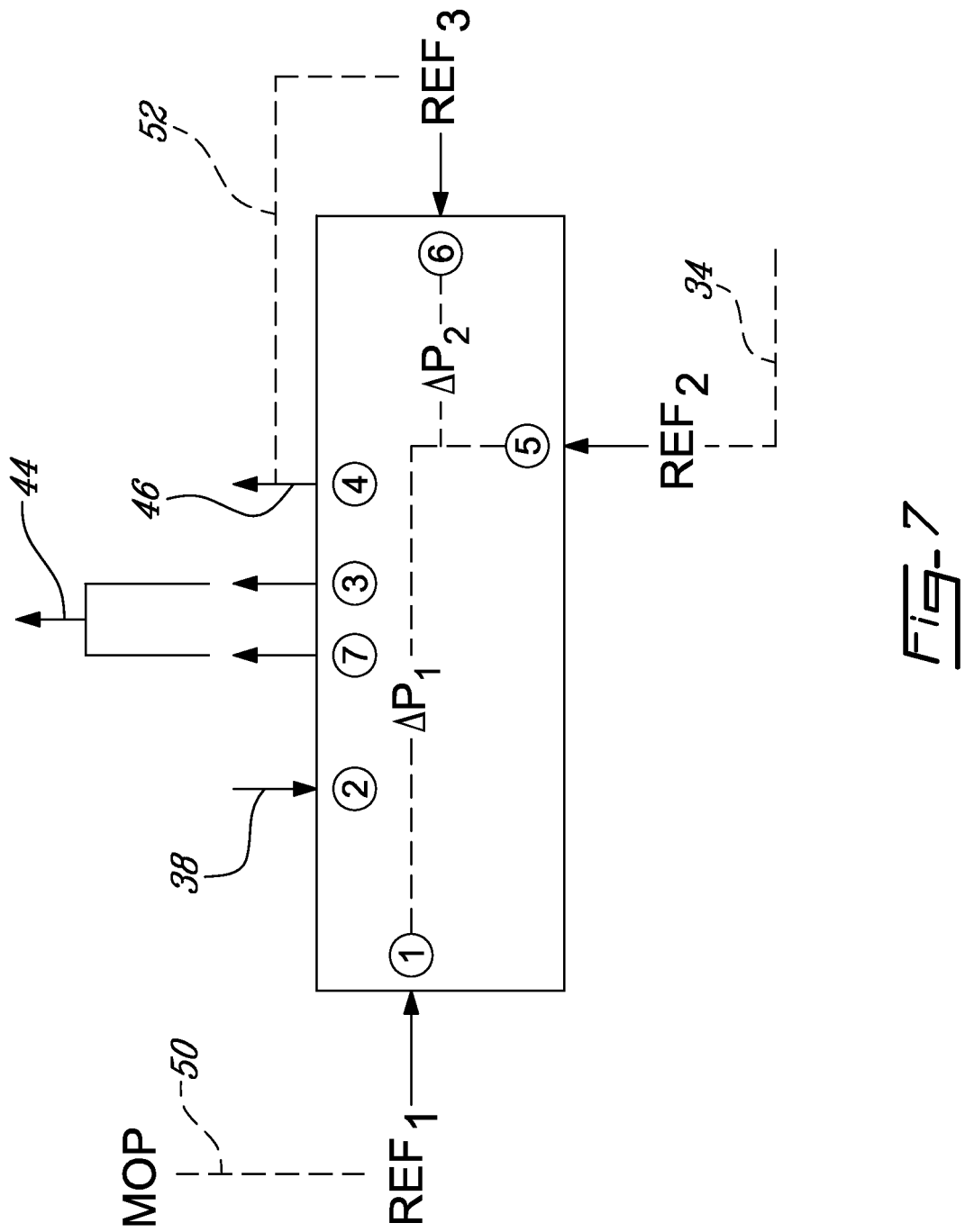
FIG. 7 is a schematic view showing the various ports of the PRV in FIG. 3.

FIGS. 4 and 5 show the various ports on the sleeve 60 of the illustrated PRV 22. FIG. 7 is a schematic view showing the location of the various ports on the sleeve 60 in FIG. 3. The first one of the ports, identified as port 1, is located at the end of the inner sleeve part 60a and comprises one relatively small opening 80 made through a closed end of the sleeve 60.

The second one of the ports, identified as port 2, comprises three circumferentially-disposed and relatively large openings 82. Oil coming from the oil inlet line 38 (FIG. 2) will enter into the sleeve 60 through these openings 82.

The third one of the ports, identified as port 3, comprises four circumferentially-disposed openings 84. The openings 84 form the main bypass outlet 40 in the illustrated example.

The fourth one of the ports, identified as port 4, comprises four circumferentially-disposed openings 86, each aligned with an intermediary portion between two of the openings 84 of port 3. The openings 86 of port 4 are progressively narrower in width on a side adjacent to the openings 84 of port 3. Oil sent back to the oil tank 28 through the oil tank line 46 will go through these openings 86.

The fifth one of the ports, identified as port 5, comprises four radial holes 88a (FIG. 5) made through the inner sleeve part 60a and four corresponding radial holes 88b (FIG. 5) made through the outer sleeve part 60b, both sets of radial holes 88a, 88b being in registry with each other when both parts 60a, 60b of the sleeve 60 are assembled together. The radial holes 88a, 88b then form what is referred hereafter as the radial holes 88 (FIG. 4).

Figure 6:
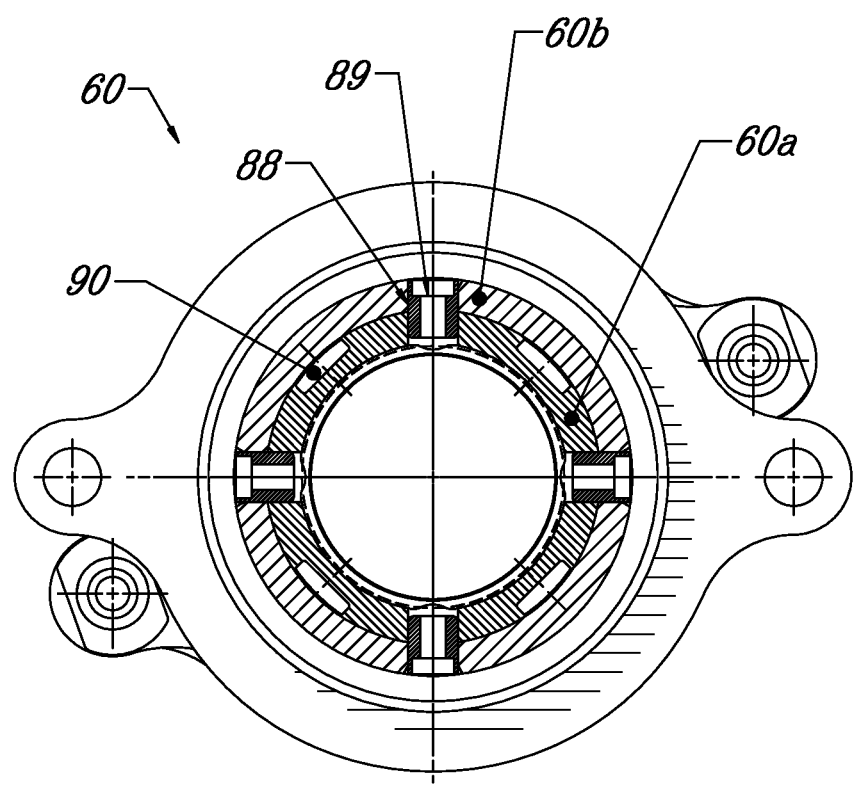
FIG. 6 is a cross-section view taken along line 6-6 in FIG. 4 and shows the axial slots and the radial holes in its two-part sleeve.

The sixth one of the ports, identified as port 6, comprises four axially-extending slots 90 made in the surface of a larger segment 92 of the inner sleeve part 60a. This larger segment 92 cooperates with the interior of the outer sleeve part 60b, as shown in FIG. 6. FIG. 6 is a cross-section view, taken along line 6-6 in FIG. 4, showing the axial slots 90 and also the radial holes 88 in the sleeve 60. It also shows that hollow pin 89 can be provided in the radial holes 88 to keep the radial holes 88a, 88b (FIG. 5) in registry during the assembly. Variants are possible as well.

Referring back to FIGS. 4 and 5, the illustrated PRV 22 further comprises a seventh port, identified as port 7. Port 7 comprises four circumferentially-disposed openings 94, each aligned with an intermediary portion between two of the openings 84 of port 3. The openings 94 of port 7 are progressively narrower in width on a side closer to the openings 84 of port 3. Port 7 is axially located between port 2 and port 3. Also, the cross-section area of the openings 94 of port 7 is significantly smaller than the cross-section area of the openings 84 of port 3 and smaller than the cross-section area of the openings 86 of port 4. It should be noted that variants of the illustrated configuration are possible. The openings 94 form the secondary bypass outlet 48 in the illustrated example.

FIG. 7 shows that port 1 receives a first reference pressure (REF1). In the illustrated example, REF1 is indicative of the MOP in the main oil supply circuit 24 through the pilot line 50, which pilot line 50 is also shown in FIG. 2. REF1 can also be taken elsewhere in the pressurized oil system 20, including at a location close to the PRV 22.

Port 2 is in fluid communication with the oil inlet 36. Port 3, since it forms the main bypass outlet 40, is in fluid communication with the bypass line 44. Port 4 is in fluid communication with the second oil outlet 42. Port 5 receives a second reference pressure (REF2) using the pilot line 34 connected to the bearing cavity (FIG. 2). Port 6 receives a third reference pressure (REF3), in this case the oil tank pressure, using the pilot line 52 (FIG. 2). The oil tank pressure was selected for REF3 since this pressure is substantially the same at all time during flight. Nevertheless, REF3 can also be the ambient pressure or be indicative of the pressure at another location in an aircraft engine. Port 7, since it forms the secondary bypass outlet 48, is in fluid communication with the bypass line 44.

As can also be seen from FIG. 7, the first pressure differential ($\Delta P_1$) is between REF1 (port 1) and REF2 (port 5), and the second pressure differential ($\Delta P_2$) is between REF2 (port 5) and REF3 (port 6). REF2 is thus used for both pressure differentials in the illustrated example. Variants are possible as well.

Figure 8:
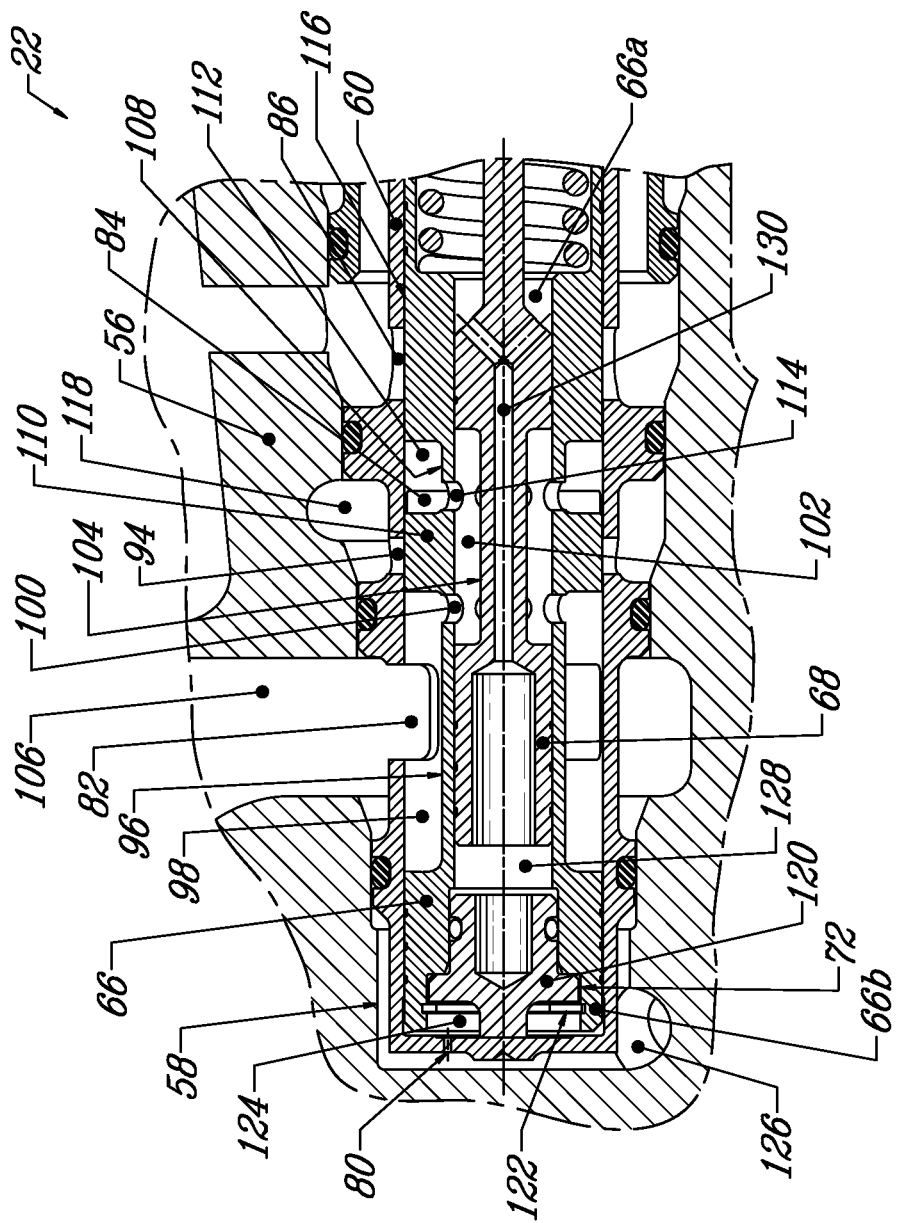
FIG. 8 shows a first enlarged area of the PRV in FIG. 3.

FIG. 8 shows a first enlarged area of the PRV 22, which area is at the left in FIG. 3. It shows that the first valve spool 66 of the illustrated example comprises a first recessed segment 96 defining a first annular chamber 98 with the interior of the sleeve 60. The first valve spool 66 includes a first port 100 providing a fluid communication between the first annular chamber 98 and a second annular chamber 102, which second annular chamber 102 is defined by a recessed segment 104 of the second valve spool 68. The first port 100 of the first valve spool 66 includes a plurality of circumferentially-disposed openings. The fluid communication between the first annular chamber 98 and the second annular chamber 102, however, is only present when the first port 100 is in registry with the second annular chamber 102, as it is the case in FIG. 8. The first annular chamber 98 is in fluid communication with the openings 82 (port 2). The valve housing body 56 comprises an annular chamber 106 surrounding the openings 82 (port 2) and which receives oil from the oil inlet line 38 (FIG. 2).

The first valve spool 66 also comprises a second recessed segment 108. The first recessed segment 96 and the second recessed segment 108 of the first valve spool 66 are axially separated from each other by an intermediate unrecessed segment 110. The second recessed segment 108 forms a third annular chamber 112 with the interior of the sleeve 60. A fluid communication between the second annular chamber 102 and the third annular chamber 112 is provided by a second port 114 of the first valve spool 66 when this second port 114 is in registry with the second annular chamber 102. The second port 114 of the first valve spool 66 includes a plurality of circumferentially-disposed openings.

In the relative position of the valve spools 66, 68 depicted in FIG. 8, the third annular chamber 112 is in fluid communication with the openings 84 (port 3) while the openings 86 (port 4) and the openings 94 (port 7) are closed. Thus, there is only an open fluid path between port 2 and port 3 in FIG. 8. Port 7 is closed since its openings 94 are obstructed by the intermediate unrecessed segment 110 of the first spool valve 66 and port 4 is closed since its openings 86 are obstructed by another unrecessed segment 116 located near the end 66a of the first valve spool 66 (at right in FIG. 8).

The valve housing body 56 comprises an annular chamber 118 surrounding port 3 and port 7, which chamber 118 leads to the bypass line 44. It should be noted that the openings 84 forming port 3 are only partially visible in FIG. 8 since they are in a staggered configuration with reference to the openings 86 of port 4 and the openings 94 of port 7.

FIG. 8 further shows that a portion of the first spool actuator 72 is provided at one end of the first valve spool 66 of the illustrated example. In this case, the first spool actuator 72 comprises a piston 120 inserted through the open chamfered end 66b of the first valve spool 66 and one side of the piston 120 is retained by a C-clip 122. Variants, however, are possible.

A chamber 124 is provided adjacent to the outer side of the piston 120 (at the left in FIG. 8). This chamber 124 receives the REF1 through the single opening 80 forming port 1. Port 1 is in fluid communication with a chamber 126 provided between one end of the valve housing cavity 58 and the outer surface at the end of the sleeve 60. On the opposite side of the first spool actuator piston 120, a chamber 128 extends between the piston 120 and one end of the second valve spool 68. This chamber 128 is in fluid communication with port 5 through a channel 130 longitudinally extending inside a portion of the second valve spool 68. Variants, however, are possible.

Figure 9:
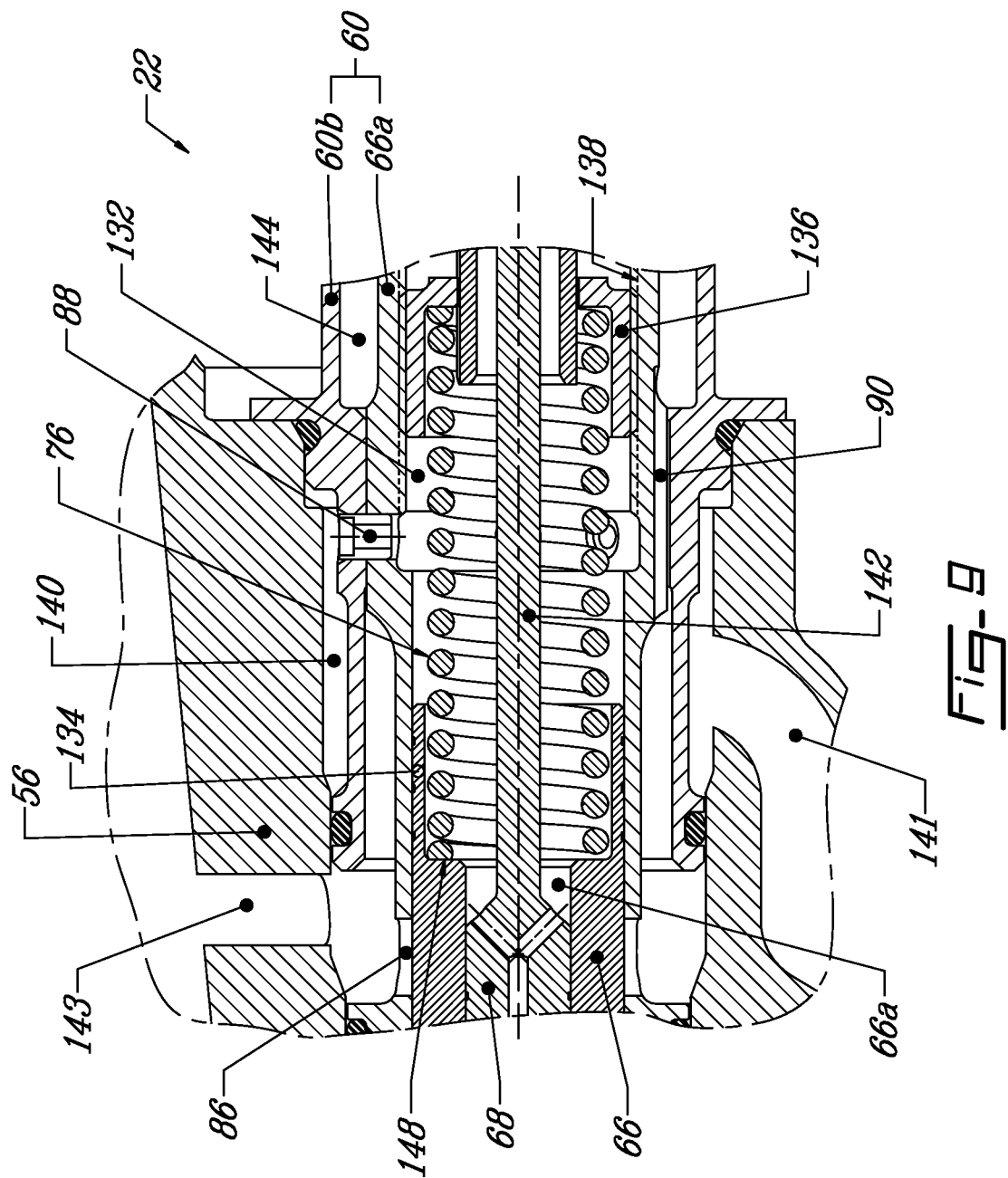
FIG. 9 shows a second enlarged area of the PRV in FIG. 3.

FIG. 9 shows a second enlarged area of the PRV 22, which area is at the center in FIG. 3. It shows a central chamber 132 within the sleeve 60, which chamber 132 is located substantially at an end 66a of the first valve spool 66. Only a hollow cylindrical projection 134 extends to the right of the first valve spool 66 in the illustrated example. The first spring 76 extends within the central chamber 132 between the first valve spool 66 and an outwardly-threaded holder 136 that is in threaded engagement with corresponding threads 138 provided on a portion of the interior of the sleeve 60. The holder 136 is axially movable within the portion of the sleeve 60 by rotating it with a tool (not shown) so as to adjust the compression force in the first spring 76.

The central chamber 132 is in fluid communication with port 5 using the radial holes 88 (see also FIG. 6). Port 5 leads to an annular chamber 140 in the valve housing body 56, which annular chamber 140 receives REF2 using the opening 141. FIG. 9 also shows the stem portion 142 of the second valve spool 68 axially extending inside the first spring 76 and through the center of the holder 136.

The axial slots 90 between the inner sleeve part 66a and the outer sleeve part 66b are shown in FIG. 9. These axial slots 90 provide a fluid communication between an annular chamber 143 surrounding the openings 86 (port 4) and another annular chamber 144 provided between the inner sleeve part 60a and the outer sleeve part 60b. The other annular chamber 144 leads to one side of a piston 146 (FIG. 10) of the second spool actuator 74. This configuration creates the pilot line 52 depicted in FIGS. 2 and 7.

It should be noted that one end of the first spring 76 abuts against a shoulder 148 forming a part of the end 66a of the first valve spool 66. In the illustrated example, this shoulder 148 is also a part of the first spool actuator piston 120 since it receives REF2 while the entire surface of the end 66b (at the left in FIG. 8) receives REF1.

Figure 10:
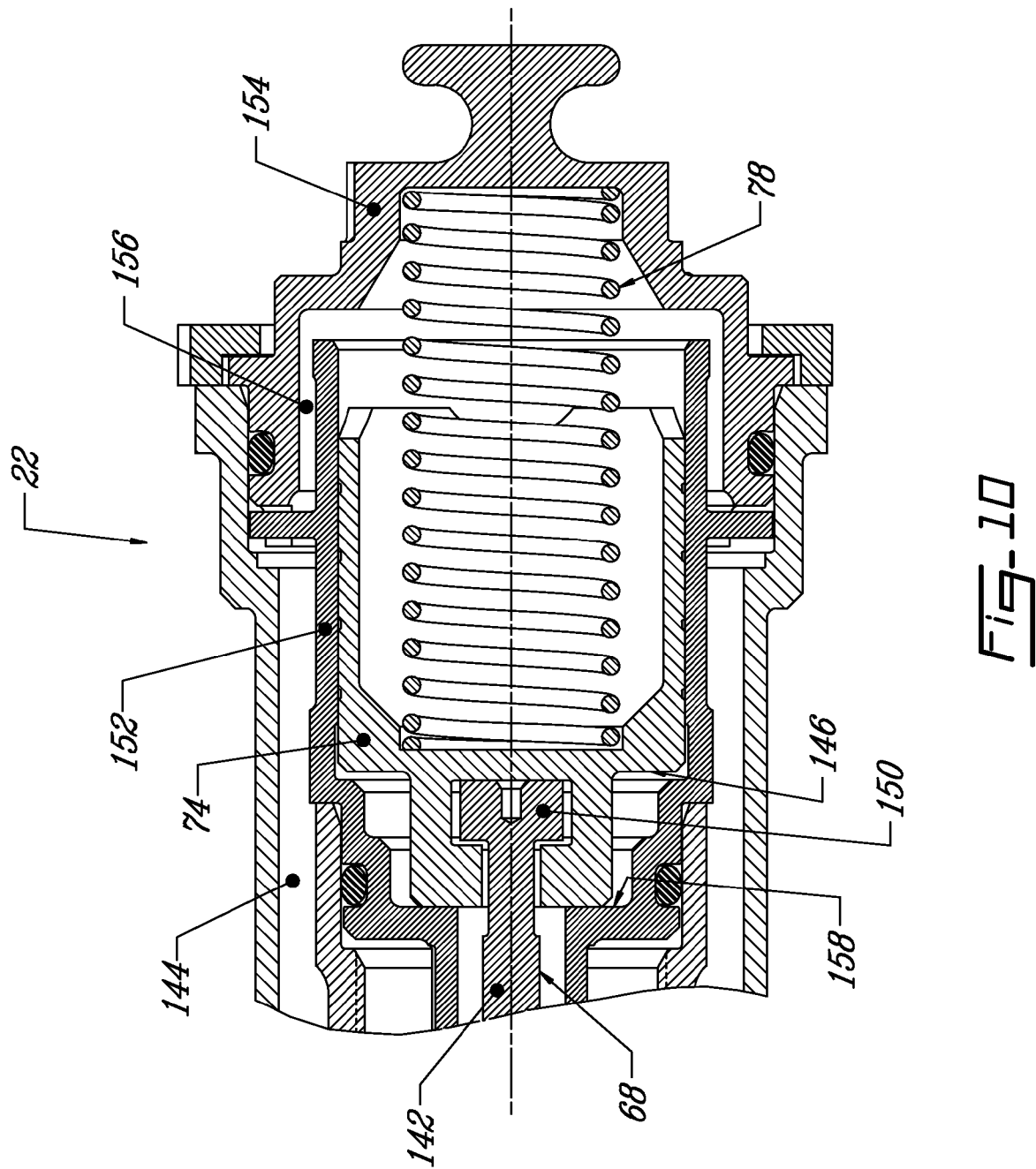
FIG. 10 shows a third enlarged area of the PRV in FIG. 3.

FIG. 10 shows a third enlarged area of the PRV 22, which area is at the right in FIG. 3. It also shows that the end of the stem portion 142 of the second valve spool 68 can be connected to the second spool actuator 74 using a T-shaped head attachment 150. This attachment 150 is designed to tolerate a slight misalignment between the stem portion 142 and the piston 146 of the second spool actuator 74. Also, the PRV 22 can be configured so that if the second valve spool 68 is not connected to the second spool actuator 74, for instance after a maintenance, the pressure readings in the aircraft cockpit will flag the defective assembly.

The second spool actuator piston 146 is movable within a corresponding cylinder 152 of the actuator 74. The cylinder 152 is maintained by an end cover 154 that is removably attached to the open end of the sleeve 60. Axial slots 156 are provided between the interior of the end cover 154 and the exterior of the cylinder 152 of the second spool actuator 74 in order to provide a fluid communication between the annular chamber 144 and the side of the second spool actuator piston 146 against which the second spring 78 is engaged in the illustrated example. The opposite end of the second spring 78 abuts against the interior of the end cover 154. Variants, however, are possible.

FIG. 10 also shows that the T-shaped head attachment 150 abuts again a face contact 158 of the second spool actuator cylinder 152. However, REF2 can still reach the adjacent side of the piston 146 (the left side of the piston 146 in FIG. 10) through the T-slot.

FIGS. 11A to 11E are cross-section views of the interior of the PRV 22 and show examples of various relative positions of the valve spools 66, 68.

Figure 11A:
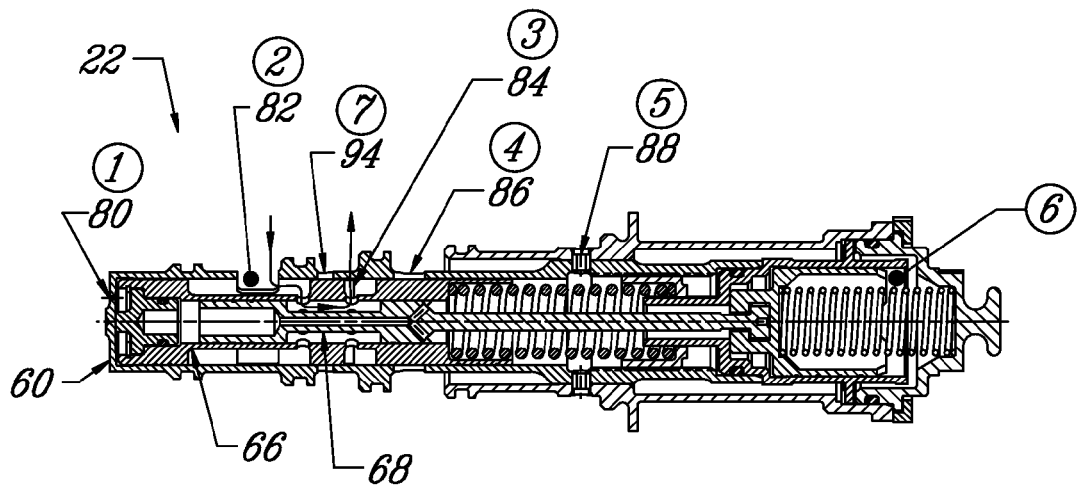
FIGS. 11A to 11E show examples of various relative positions of the valve spools of the PRV in FIG. 3.

FIG. 11A shows the PRV 22 in what is referred to as the closed position of the PRV 22. This can be, for instance, the position of the PRV 22 when the aircraft engine has just been started and still rotates at a rotational speed well below idle speed. At the instant depicted in FIG. 11A, oil is diverted to the main bypass outlet 40 and follows a first oil path, which first oil path is between port 2 and port 3. Ports 4 and 7 are closed.

Figure 11B:
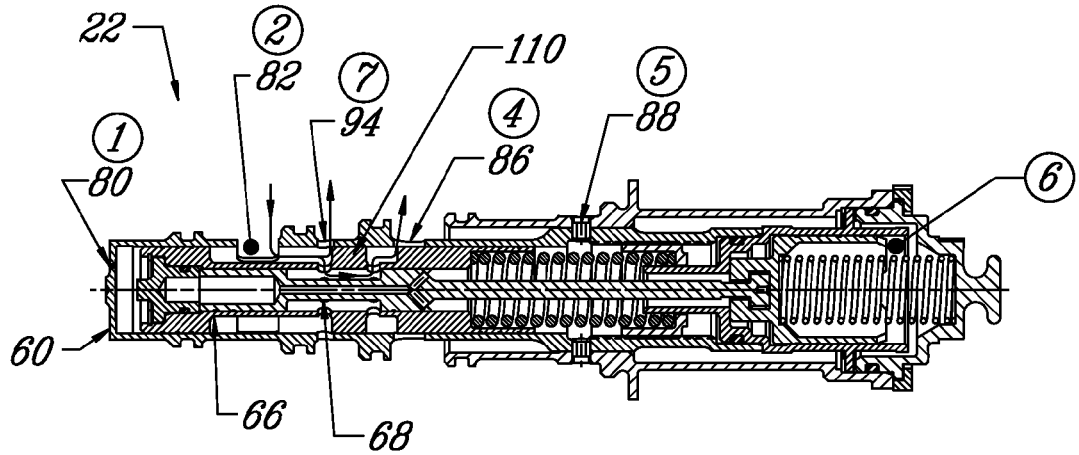

FIG. 11B shows an intermediate sub-idle position. As can be seen, the first valve spool 66 moved away from its first position and the second valve spool 68 is still in its first position. At that point, port 3 is now closed by the intermediary unrecessed segment 110 of the first valve spool 66 because the first oil path is no longer required (as, for instance, the pressure seals in the aircraft engine have now reached a minimum operating pressure). The second valve spool actuator 74, however, has not reached its threshold pressure yet to move the second valve spool 68 towards its second position. A second oil path is now provided in the PRV 22, the second oil path being between the oil inlet (port 2) and the second oil outlet (port 4). A third oil path is also provided in the PRV 22, the third oil path being between the oil inlet (port 2) and the third oil outlet (port 7). Thus, the PRV 22 started regulating the MOP by varying the flow area of the oil paths.

Figure 11C:
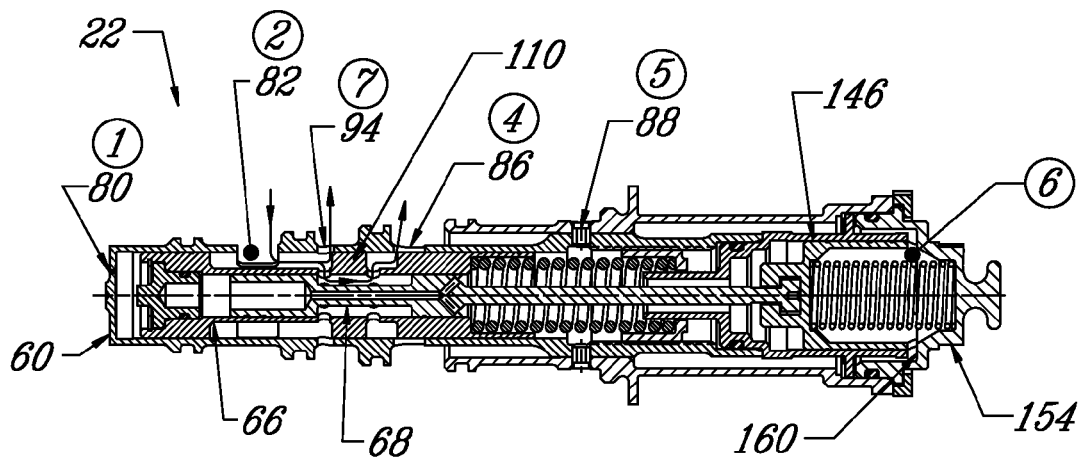

FIG. 11C shows the running condition when the engine is rotating between idle speed and the maximum rotational speed. The first spool valve 66 still regulates the MOP and the second pressure differential is now above the threshold pressure. The second spool actuator 74 thus generates a force greater than the preload provided by the second spring 78. This caused the second valve spool 68 to move to its second position at some point between FIG. 11B and FIG. 11C. Thus, the illustrated PRV 22 is designed so that the first valve spool 66 moves away from its first position before the second valve spool 68 toggles from its first position to its second position. The PRV 22 is designed so that the second and third oil paths are not affected by the second valve spool 68. The second actuator piston 146 now abuts on one side against a face 160 of the end cover 154 when the second valve spool 68 is at its second position.

It should be noted that while the second valve spool 68 is essentially designed to toggle between its first and second positions and remains at its second position once the aircraft engine is running above the idle speed, the first valve spool 66 generally remains somewhere between its first and second positions and moves to regulate the MOP.

Figure 11D:
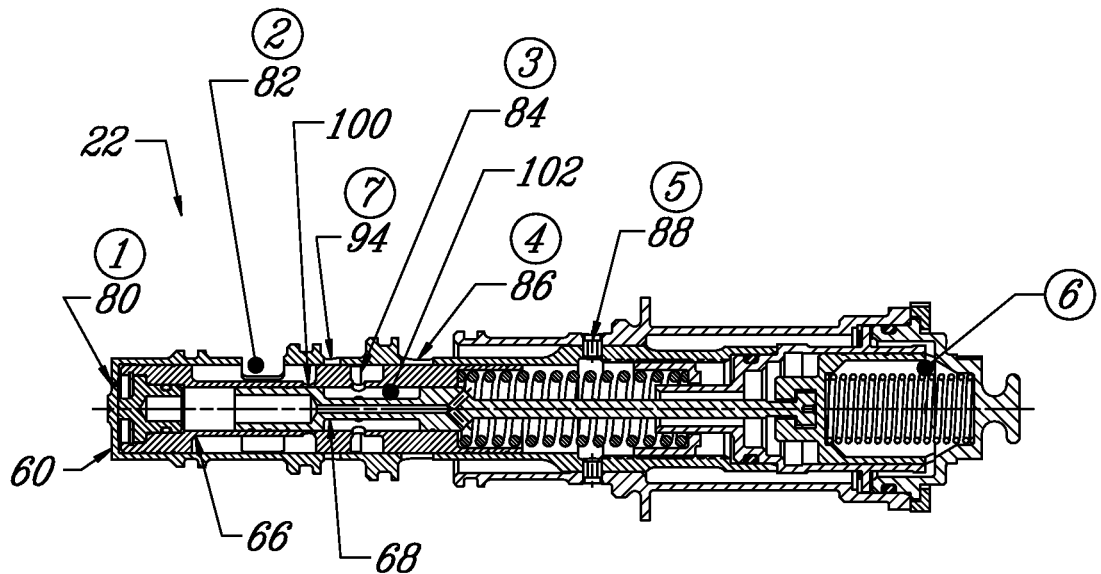

FIG. 11D shows what can happen during a negative-g event (or another event that can cause the MOP to drop). Since the MOP is much lower than before, REF1 now has a much lower value at port 1. This caused the first valve spool 66 to move back to its first position in the illustrated example. However, the second valve spool 68 remains in its second position because REF2 is sill higher than REF3 and the resulting force is also still higher than the second spring preload. As can be seen, the first oil path between port 2 and port 3 remains closed because the first port 100 in the first valve spool 66 and the second annular chamber 102 are not in registry. Thus, all oil outlets 40, 42, 48 of the PRV 22 are now closed.

After the negative-g events, air bubbles in the main oil supply circuit 24 will dissipate and the MOP will increase rapidly since all oil outlets of the PRV 22 are closed. The first spool actuator 72 will then move the first valve spool 66 away from its first position (for instance, to a position similar to the one shown in FIG. 11C) and the PRV 22 will be regulated by the PRV 22 as usual.

Figure 11E:
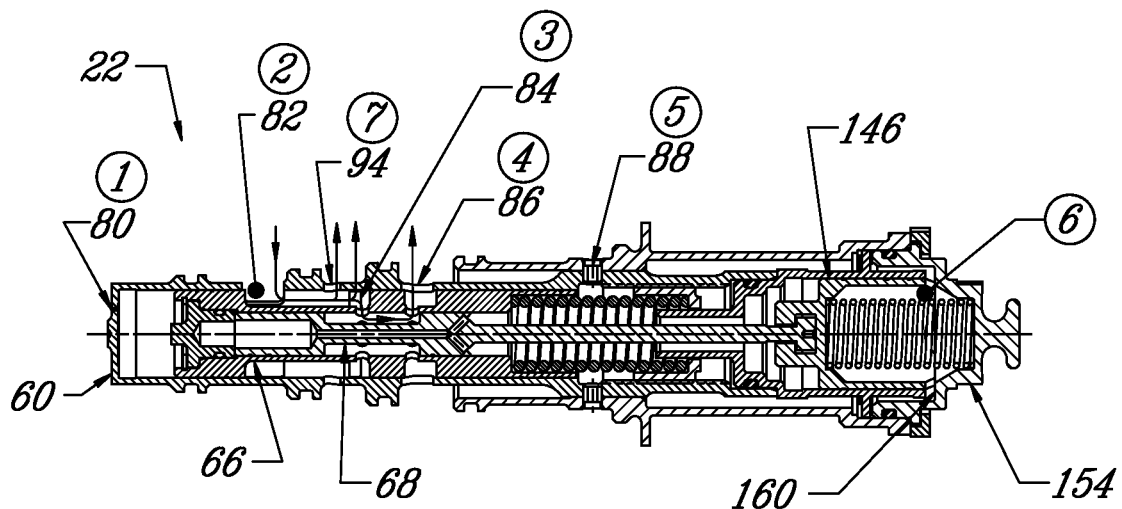

FIG. 11E shows another relative position that may occur, for instance, during a cold start. In this case, the oil inlet 36 of the PRV 22 is in fluid communication with all three oil outlets 40, 42, 48. All oil paths are fully open to lower the MOP. As can be seen, the second valve spool 68 acts as a stopper in FIG. 11E to prevent the first spring 76 from being fully compressed when the first valve spool 66 is at its second position.

Overall, the PRV 22 provides an improved method of regulating fluid pressure in a pressurized fluid system of an aircraft engine. This method can be carried out, for instance, by starting the aircraft engine from a rotational speed below idle speed and diverting at least some of the fluid through a main recirculation bypass while a pressure differential between the fluid pressure and another location in the aircraft engine is below a threshold value. While the aircraft engine is still below idle speed, the recirculation bypass is closed when the pressure differential reaches the threshold value. The fluid pressure is maintained within a target range when the aircraft engine is above idle speed and the pressure differential is above the threshold value. Then, while the aircraft engine is still above idle speed, the recirculation bypass is prevented from opening if the pressure differential falls below the threshold value, for instance during a negative-g event.

When the aircraft engine is shut-down, its rotational speed will go from above idle speed to below idle speed. Once the pressure differential falls below the threshold pressure, the main recirculation bypass can be opened once again.

The above description is meant to be exemplary only, and one skilled in the art will recognize that changes may be made to what is described. For example, the PRV does not need to have a secondary bypass outlet or be configured exactly as shown in the appended figures. The pressurized fluid system can be different from the one that is shown and described. The fluid does not necessarily need to be oil and the pressurized fluid system can be a fuel system, for instance. The spool actuators and/or the springs can be different compared to the ones shown and described herein. Still many other modifications will be apparent to those skilled in the art, in light of a review of this disclosure, and such modifications are intended to fall within the appended claims.

What is claimed is:

1. A fluid pressure regulating valve for a pressurized fluid system of an aircraft engine, the pressurized fluid system including at least a main supply circuit, a supply pump and a fluid tank, the valve comprising:

a valve housing, the valve housing comprising a hollow valve housing body and an elongated sleeve having at least a portion inserted in the valve housing body, the sleeve having a plurality of axially spaced-apart ports, a first one of the ports receiving a first reference pressure, a second one of the ports in fluid communication with the main supply circuit, a third one of the ports in fluid communication with a location upstream the supply pump, a fourth one of the ports in fluid communication with the fluid tank, a fifth one of the ports receiving a second reference pressure, and a sixth one of the ports receiving a third reference pressure;

a first valve spool in sliding engagement with an interior of the sleeve, the first valve spool being movable along a longitudinal axis of the sleeve between a first position and a second position in response to a first pressure differential between the first port and the fifth port; and a second valve spool in sliding engagement with an interior of the first valve spool, the second valve spool being movable along the longitudinal axis between a first position and a second position, the second valve spool preventing fluid from passing between the second port and the third port when a second pressure differential between the fifth port and the sixth port exceeds a minimum threshold and the first valve spool is substantially at its first position.

2. The valve as defined in claim 1, wherein the valve comprises a first spool actuator mounted to the first valve spool and a second spool actuator mounted to the second valve spool, the first spool actuator generating a first actuating force in response to the first pressure differential and the second spool actuator generating a second actuating force in response to the second pressure differential.

3. The valve as defined in claim 2, wherein the valve comprises a first spring generating a first preload force acting on the first valve spool, the preload force being opposite the first actuating force and biasing the first valve spool toward its first position, the valve further comprising a second spring generating a second preload force on the second valve spool, the second preload force being opposite the second actuating force and biasing the second valve spool towards its first position.

4. The valve as defined in claim 3, wherein the first spool actuator and the second spool actuator each include a piston, at least a portion of one side of the first spool actuator piston being in fluid communication with one side of the second spool actuator piston through an internal channel longitudinally extending inside a portion of the second valve spool.

5. The valve as defined in claim 1, wherein the valve comprises a fluid path including a first portion passing through a first annular chamber provided between the interior of the sleeve and a recessed segment on the first valve spool, and a second portion passing through a second annular chamber provided between the interior of the first valve spool and a recessed segment of the second valve spool.

6. The valve as defined in claim 5, wherein the first valve spool includes a port for providing a fluid communication between the first and the second annular chamber when the first valve spool port is in registry with the second annular chamber, the first valve spool port and the second annular chamber being out of registry when the first valve spool is substantially at its first position and the second valve spool is substantially at its second position.

* * * * *